United States Patent Office 2,910,344
Patented Oct. 27, 1959

2,910,344

METHOD OF PREPARING UF$_6$

Norman R. Davidson, Sierre Madre, Calif., and Sherman Fried, Chicago, Ill., assignors to the United States of America as represented by the United States Atomic Energy Commission No Drawing. Application April 9, 1948
Serial No. 20,093

1 Claim. (Cl. 23—14.5)

The present invention relates to a process for the halogenation of a heavy element. More particularly, it is concerned with the conversion of uranium tetrafluoride to uranium hexafluoride.

The element uranium in its natural state consists of three isotopes: $U^{234}$, $U^{235}$, and $U^{238}$. $U^{238}$ is most abundant, comprising 99.3% of natural uranium and $U^{235}$ comprising about 0.7%. The amount of $U^{234}$ is negligible, comprising only about 0.0034%. Uranium is much used as a nuclear fuel in pile reactors and for this purpose it is often desirable to separate the $U^{235}$ isotope from the $U^{238}$ isotope. Numerous methods have been devised to produce this separation. One of the most important of these methods is the gaseous diffusion process. This process is based upon the discovery of Lord Rayleigh in 1896 that a mixture of two gases of different atomic weight could be partly separated by allowing some of it to diffuse through a porous barrier into an evacuated space. Because of their higher average speed, molecules of the light gas diffuse through the barrier faster, so that the gas which is passed through the barrier is enriched in the lighter constituent and the residual gas is impoverished in the lighter constituent. This principle has been applied to the separation of uranium isotopes and the uranium-containing gas normally used is uranium hexafluoride, since this is one of the very few uranium compounds which is gaseous at moderate temperatures. The $U^{235}F_6$ is three mass units lighter than the $U^{238}F_6$ compound. Uranium hexafluoride has a pressure of one atmosphere at a temperature of 56° C. The uranium hexafluoride used in this process in the past has been usually obtained by the reaction of gaseous fluorine with uranium pentachloride. This method of preparing uranium hexafluoride has certain disadvantages, however. For example, the use of gaseous fluorine is a health hazard and its use causes considerable corrosion to reaction vessels. It would be therefore highly advantageous if this process of forming uranium hexafluoride, involving use of gaseous fluorine, could be replaced with a method which did not employ gaseous fluorine.

It is an object of this invention to provide a novel method of forming uranium hexafluoride which does not involve the use of gaseous fluorine in the process.

Broadly, the present invention comprises treating the uranium tetrafluoride with dry oxygen gas at a temperature between about 600 and 1300° K. and preferably at a temperature of about 1073° K. (800° C.) whereby uranium hexafluoride is formed. The formation of the uranium hexafluoride is accomplished in accordance with the following equation:

$$2UF_4 + O_2 \rightarrow UF_6 + UO_2F_2$$

In its preferred embodiment the process of this invention consists essentially of treating uranium tetrafluoride with oxygen at an elevated temperature under substantially anhydrous conditions, and condensing the uranium hexafluoride vapor thus formed, at a fairly low temperature. The presence of any substantial amount of water vapor or of hydrogen in the reaction apparatus will seriously affect the process, by causing the formation of other compounds such as $UO_2F_2$ or $U_3O_8$, or by reacting with the uranium hexafluoride formed to give a different end product. An example of one of the reactions which occurs in the presence of water vapor is the following:

$$UF_4 + \tfrac{1}{2}O_2 + H_2O \rightarrow UO_2F_2 + 2HF$$

The $UO_2F_2$ in turn may decompose to $U_3O_8$. The partial pressure of water vapor present in the reaction apparatus should be less than about $10^{-2}$ mm. of Hg, and in order to obtain the maximum yield of uranium hexafluoride the partial pressure of the water vapor is preferably less than about $10^{-8}$ mm. of Hg. The oxygen used should be substantially free of water vapor, and it has been found preferable to use oxygen obtained from liquid oxygen in which the partial pressure of the water vapor is not greater than about $10^{-8}$ mm. of Hg. The reaction equipment used should not contain silica, since any hydrogen fluoride produced in the presence of a slight amount of water vapor or hydrogen would be regenerated by reaction with silicon dioxide and would adversely affect the yield of uranium hexafluoride. The most desirable materials to use in the reaction equipment have been found to be calcium fluoride, platinum, and pre-fluorinated nickel. Untreated nickel may be used but there is some tendency for the uranium hexafluoride to be reduced to uranium tetrafluoride through contact with the nickel tube, thus decreasing the yield of uranium hexafluoride. The uranium hexafluoride vapor is condensed by bringing it in contact with a wall maintained at a temperature below the melting point of uranium hexafluoride, i.e., 56° C. It has been found desirable, however, to maintain the condensing chamber at a much lower temperature, for example, the temperature of liquid oxygen, −183° C. in order to obtain the maximum condensation of uranium hexafluoride. Following completion of the reaction the residue of $UO_2F_2$, which remains in the reaction chamber may be converted to uranium tetrafluoride by treatment with hydrogen to produce uranium dioxide which may in turn be treated with hydrogen fluoride to produce the uranium tetrafluoride. This uranium tetrafluoride may then be reused by the process of this invention.

The process of the present invention may be further illustrated by the following specific examples.

*Example I*

A nickel reaction chamber was set up and connected to a U-tube, cooled by liquid oxygen. A 4.31 g. UF$_4$ sample was placed in the nickel tube and the apparatus was degassed to free it of all water vapor. A UF$_4$ sample was then heated to about 800° C., while dry oxygen gas obtained from liquid oxygen was passed through the reaction chamber. Solid UF$_6$ condensed in the U-tube and this solid UF$_6$ was subsequently treated with aqueous ammonia. A yellow precipitate of diuranate formed. Chemical analysis of the sublimate gave 0.260 g. of uranium and 0.133 g. of fluorine, corresponding to a ratio of 6.41 atoms of fluorine to 1 of uranium.

*Example II*

A reaction system was set up consisting of a nickel tube enclosed in an electric heater and connected to two U-tubes in series, the first of which contained 35 mg. of KF. A 5.97 g. UF$_4$ sample contained in a platinum boat was placed in the nickel tube and the system was degassed to free it of all water vapor. The nickel tube was heated to 800° C. and dry oxygen gas obtained from liquid oxygen and in which the partial pressure of water vapor present was not greater than $10^{-8}$ mm. of Hg, was passed over the $UF_4$ at a rate of about 35 cc./min. for one hour. The first U-tube containing the 35 mg. of KF was cooled with liquid oxygen and a white condensate collected in this tube during the reaction. Upon completion of the reaction, this tube was sealed off from the reaction chamber, the liquid oxygen removed and the white condensate sublimed in vacuo into the second U-tube which was maintained at $-78°$ C. This second tube was then sealed off and the melting point of the $UF_6$ sublimate determined as $65.3-65.8°$ C. This temperature agrees well with the generally recognized triple point of $UF_6$ which is $64.05°$ C. The re-sublimed $UF_6$ was found to weigh 1.30 g., a yield of 39% of the theoretically possible yield. The residue remaining in the reaction chamber weighed 2.09 g., or 71.4% of the theoretical yield and was identified by X-ray analysis as $UO_2F_2$.

It will be apparent to those skilled in the art that various modifications of the present invention exist. In general it may be said that any process for the formation of uranium hexafluoride by the treatment of uranium tetrafluoride with dry oxygen is to be considered as lying within the scope of the present invention.

What is claimed is:

The method of preparing uranium hexafluoride, which comprises treating uranium tetrafluoride with oxygen in a pre-fluorinated nickel vessel, wherein the partial pressure of the water vapor present is not greater than $10^{-8}$ mm. of Hg, at a temperature of between about 600 and 1300° K., and condensing the uranium hexafluoride vapor thus formed at a temperature of below about 56° C.

References Cited in the file of this patent

Gmelin-Kraut: Handbuch der anorganischen Chemie, vol. 3.1, p. 1108 (1912).

UNITED STATES PATENT OFFICE

CERTIFICATE OF CORRECTION

Patent No. 2,910,344                              October 27, 1959

Norman R. Davidson et al.

It is hereby certified that error appears in the above numbered patent requiring correction and that the said Letters Patent should read as corrected below.

Column 2, line 19, after the period insert -- The reaction chamber should be carefully degassed prior to commencing the reaction. --.

Signed and sealed this 14th day of November 1961.

(SEAL)
Attest:

ERNEST W. SWIDER
Attesting Officer

DAVID L. LADD
Commissioner of Patents
USCOMM-DC